United States Patent
Chu et al.

(10) Patent No.: US 7,469,335 B2
(45) Date of Patent: Dec. 23, 2008

(54) POWER-ON METHOD FOR COMPUTER SYSTEM THAT COPIES BIOS INTO CACHE MEMORY OF HYPER-THREADING PROCESSOR

(75) Inventors: Hsiu-Ming Chu, Taipei (TW); Kuan-Jui Ho, Taipei (TW)

(73) Assignee: Via Technologies, Inc., Taipei (TW)

( * ) Notice: Subject to any disclaimer, the term of this patent is extended or adjusted under 35 U.S.C. 154(b) by 648 days.

(21) Appl. No.: 11/135,203

(22) Filed: May 23, 2005

(65) Prior Publication Data

US 2006/0129789 A1    Jun. 15, 2006

(30) Foreign Application Priority Data

Dec. 15, 2004    (TW) .............................. 93138929 A

(51) Int. Cl.
*G06F 9/24* (2006.01)
(52) U.S. Cl. .......................................... 713/2; 711/118
(58) Field of Classification Search .................. 713/1, 713/2; 711/118
See application file for complete search history.

(56) References Cited

U.S. PATENT DOCUMENTS 7,216,223 B2 * 5/2007 Michaelis ................... 713/100
7,254,676 B2 * 8/2007 Datta et al. ................. 711/118
2004/0103272 A1 * 5/2004 Zimmer et al. ................ 713/1

* cited by examiner

*Primary Examiner*—Thomas Lee
*Assistant Examiner*—Albert Wang
(74) *Attorney, Agent, or Firm*—Thomas, Kayden, Horstemeyer & Risley

(57) ABSTRACT

A power-on method for a computer system comprising a processor supporting Hyper-Threading, a Read Only Memory (ROM) and a main memory, wherein the processor comprises a cache memory and the ROM comprises BIOS codes. The power-on method comprises the following steps. First, the processor is initialized in a Hyper-Threading disabled mode. The BIOS codes is then copied from the ROM to the cache memory, and the main memory is initialized by executing the BIOS codes therein. Thereafter, the processor is re-initialized in a Hyper-Threading enabled mode after the main memory is initialized. The processor comprises a first logic unit and a second logic unit. When initializing the processor, a first potential is applied to pin A31 of the processor, and a reset signal is delivered to the processor while the pin A31 is at the first potential, such that the processor is initialized in the Hyper-Threading disabled mode.

15 Claims, 3 Drawing Sheets

POWER-ON METHOD FOR COMPUTER SYSTEM THAT COPIES BIOS INTO CACHE MEMORY OF HYPER-THREADING PROCESSOR

BACKGROUND

The invention relates to a power-on method for a computer system, and in particular, to a method of initializing a computer system comprising a processor supporting hyper-threading FIG. 1 shows a conventional computer system diagram. The computer system 100 comprises a processor 102, Northbridge 104, main memory 106, Southbridge 108 and ROM 110. The processor 102 comprises a cache memory 112. The ROM 110 comprises BIOS codes for initialization of the components in the computer system 100, such as main memory refresh cycle and clock frequency. When the computer system 100 is powered on, a Power On Self Test (POST) is processed, and BIOS codes stored in the ROM 110 are executed by the Northbridge 104 and Southbridge 108 for system calibration and activation. Simultaneously, the main memory 106 is initialized by the processor 102 based on the instructions in the BIOS codes stored in the ROM 110. Conventionally, the initialization of main memory 106 comprises a plurality of complex procedures such as read/write tests, thereby corresponding results are stored in the registers of Northbridge 104 for system operation. As shown in route 2, cache memory 112 is utilized to store a copy of the BIOS codes, and the results of read/write tests. Route 3 shows that the processor 102 directly executes the BIOS codes in the cache memory 112 to initialize the main memory 106 and program the Northbridge 104. The performance is improved because the speed of cache memory 112 is much faster than ROM 110.

The described power-on method, however, is not adaptable for processors supporting Hyper-Threading technologies. A Hyper-Threading processor comprising two logic units, only activates the first logic unit by default at power-on. A specific initialization procedure is required to activate the second logic unit, and the Hyper-Threading processor is not fully operational until a supported operating system is loaded. The initialization procedure for the second logic unit requires help of the main memory 106 that requires the cache memory 112 to initialize, as shown in Route 2 and 3 in FIG. 1. By default, before the second logic unit is initialized, the cache memory 112 is in a mode referred to as "No-Fill Cache" that is not usable due to the disorder of write back address allocation. As a result, a deadlock occurs.

SUMMARY

An embodiment of the invention provides a power-on method for a computer system comprising a processor supporting Hyper-Threading, a Read Only Memory (ROM) and a main memory, wherein the processor comprises a cache memory, and the ROM comprises BIOS codes. The power-on method comprises the following steps. First, the processor is initialized in a Hyper-Threading disabled mode. The BIOS codes are then copied from the ROM to the cache memory, and the main memory is initialized by executing the BIOS codes therein. Thereafter, the processor is re-initialized in a Hyper-Threading enabled mode after the main memory is initialized. The processor comprises a first logic unit and a second logic unit. When initializing the processor, a first potential is applied to pin A31 of the processor, and a reset signal is delivered to the processor while the pin A31 is at the first potential, such that the processor is initialized in the Hyper-Threading disabled mode. Only the first logic unit is activated in the Hyper-Threading disabled mode. When re-initializing the processor, a second potential is provided to pin A31 of the processor, and a reset signal is delivered to the processor while the pin A31 is at the second potential, such that the processor is initialized in the Hyper-Threading enabled mode. Both the first logic unit and the second logic unit are activated in the Hyper-Threading enabled mode. The power-on method further comprises the following steps. After the processor is re-initialized in the Hyper-Threading enabled mode, the second logic unit is initialized, and an operating system is loaded. The first potential represents logic "1" and the second potential represents logic "0".

Another embodiment of the invention provides a computer system implementing the described power-on method, and a further embodiment provides the BIOS codes processing the described power-on method.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION

Figure 1:
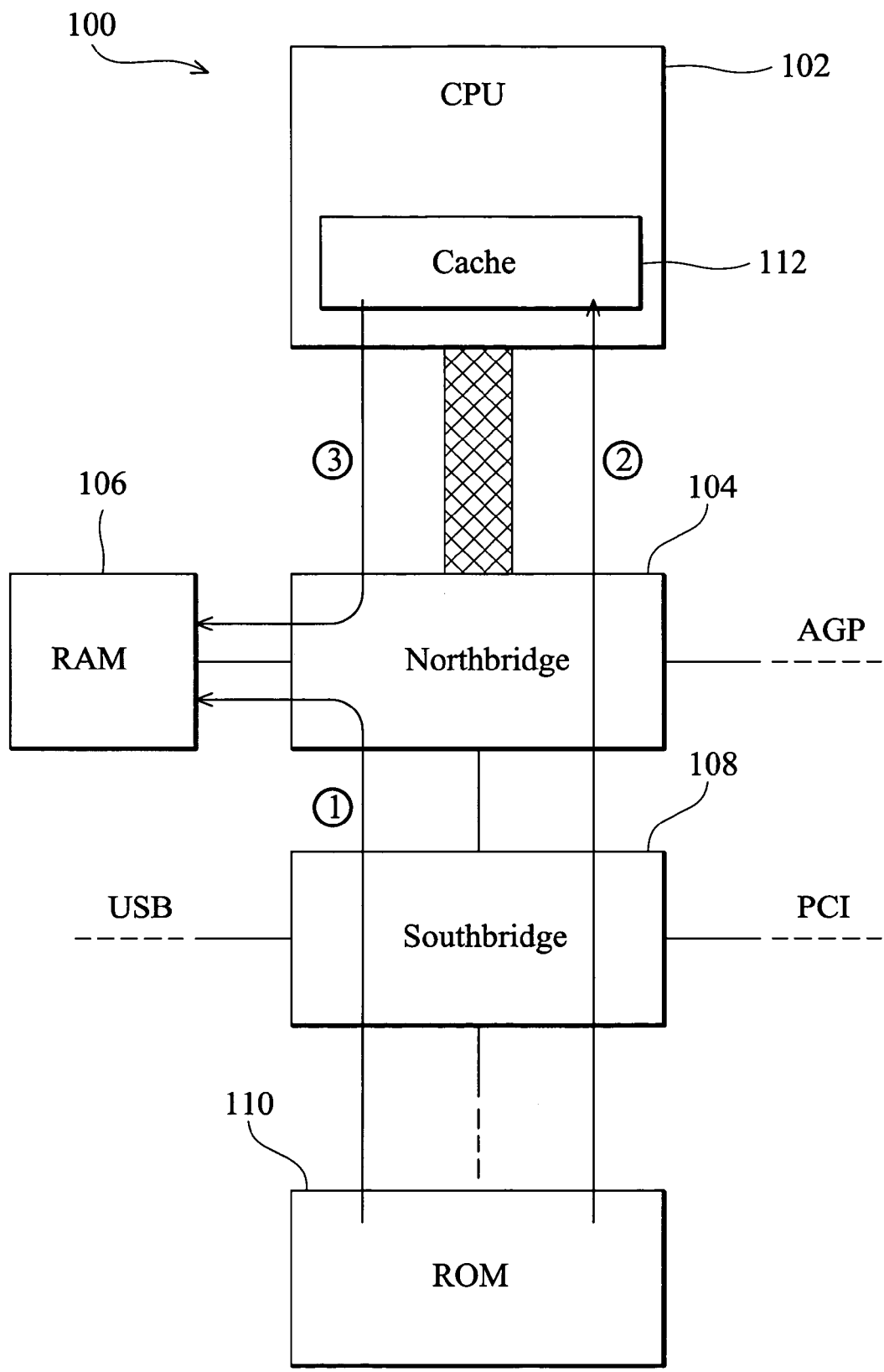
FIG. 1 shows a conventional computer system diagram.
Figure 2:
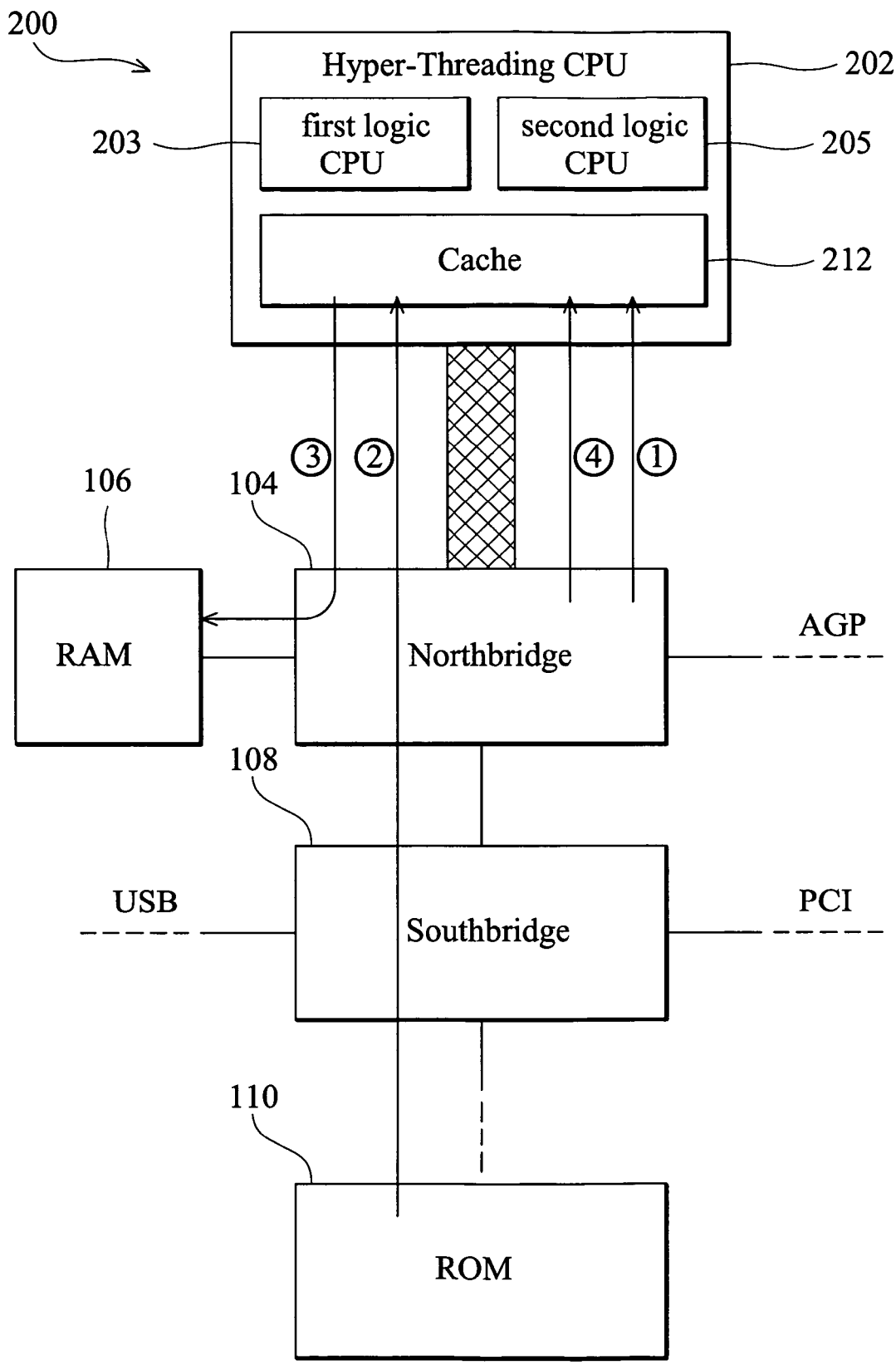
FIG. 2 shows an embodiment of a computer system diagram according to the invention.

FIG. 2 shows an embodiment of a computer system 200. The computer system 200 comprises Northbridge 104, main memory 106, Southbridge 108 and ROM 110. Additionally, the computer system 200 comprises a Hyper-Threading processor 202 supporting Hyper-Threading. The Hyper-Threading processor 202 comprises a first logic unit 203, a second logic unit 205, and a cache memory 212. The Northbridge 104 is coupled to the Hyper-Threading processor 202 via a Front Side Bus (FSB), and the Northbridge 104 is coupled to the main memory 106 via a memory bus. The Northbridge 104 is also coupled to a graphics processor via an Accelerated Graphics Port (AGP). The Southbridge 108 performs data linking to low speed components via Peripheral Connection Interface (PCI) and Universal Serial Bus (USB). The ROM 110 comprises BIOS codes and custom parameters, for system initialization and control. When the Hyper-Threading processor 202 is powered on, the first logic unit 203 is activated by default, and the cache memory 212 is in a No-Fill Cache mode. To enable the cache memory 212, initialization of the second logic unit 205 is required. The initialization of the second logic unit 205 further requires help of main memory 106. Therefore it is necessary to initialize the main memory 106 before initializing the second logic unit 205.

The Hyper-Threading processor 202 comprises a pin referred to as A31 (not shown), functioning as a switch for enabling Hyper-Threading. If pin A31 is asserted at power on, the Hyper-Threading processor 202 is initialized in a Hyper-Threading disabled mode, wherein the second logic unit 205 is not activated, and only the first logic unit 203 is activated. As a result, the Hyper-Threading processor 202 functions as a single processor, and the cache memory 212 is adaptable. In practice, the pin is not limited to A31 and the signal assertion is dependant on the specification of processor vendors.

Figure 3:
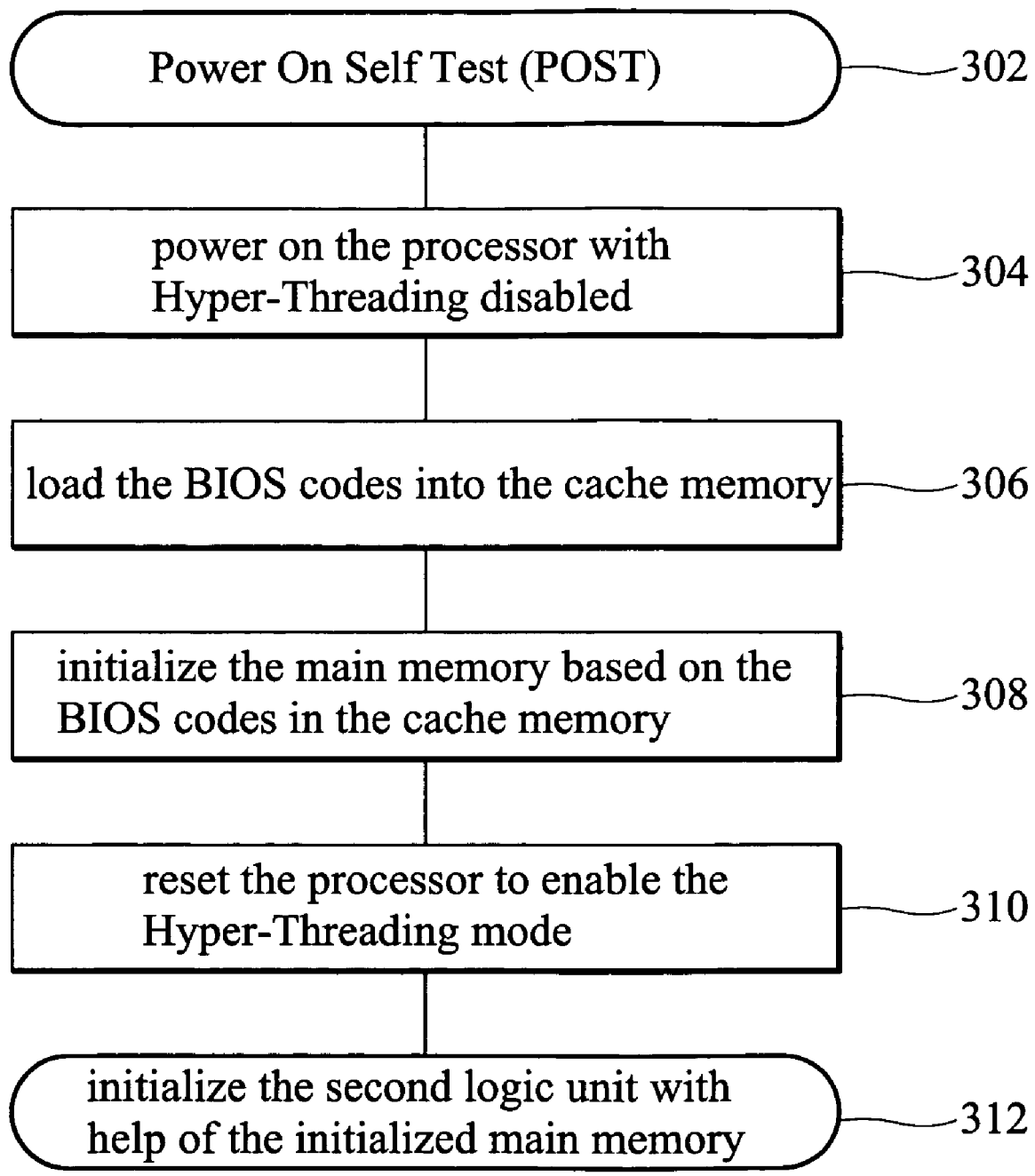
FIG. 3 is a flowchart of the embodiment shown in FIG. 2.

FIG. 3 is a flowchart of the power-on method according to an embodiment of the invention. In step 302, at power on, the Northbridge 104 and Southbridge 108 are activated, BIOS codes stored in the ROM 110 are read and executed and the computer system 200 process Power on Self Test (POST). In step 304, as shown in route 1 in FIG. 2, the Northbridge 104 asserts the A31 to high potential and delivers a reset signal to the Hyper-Threading processor 202, thereby the Hyper-Threading processor 202 is re-initialized in a Hyper-Threading disabled mode. As a result, the first logic unit 203 and cache memory 212 function as a single processor. In step 306, as shown in route 2 in FIG. 2, the Northbridge 104 copies the BIOS codes stored in the ROM 110 to the cache memory 212. In step 308, as shown in route 3 in FIG. 2, the BIOS codes in cache memory 212 are executed by the first logic unit 203 to initialize the main memory 106, where the initialization comprises test procedures and configurations, and the performance thereof is increased because the cache memory 212 is faster than the ROM 110. In step 310, when the initialization of main memory 106 is complete, the Northbridge 104 de-asserts the A31 to low potential and delivers a reset signal to the Hyper-Threading processor 202, such that the Hyper-Threading processor 202 is re-initialized in a Hyper-Treading enabled mode, as shown in route 4 of Fig 2. As a result, the second logic unit 205 can be initialized with help of the main memory 106. In step 312, when the first logic unit 203 and second logic unit 205 in the Hyper-Threading processor 202 are both activated, an operating system can then be loaded to make the Hyper-Threading processor 202 full operational.

In this embodiment, the Hyper-Threading processor 202 is reset twice, clearing data in the registers thereof. To reduce redundancy, only the most essential steps are processed before the second reset, such as initialization of the main memory 106. The Hyper-Threading processor 202 is an Intel Pentium 4® processor in this case, and the main memory 106 can be SDRAM or DDRRAM. The ROM 110 can be EEPROM. In summary, the invention takes the advantage of cache memory 112 at power-on, and avoids No-Fill Cache problems by control of pin A31.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power-on method for a computer system comprising a processor supporting Hyper-Threading, a Read Only Memory (ROM) and a main memory, wherein the processor comprises a cache memory and the ROM comprises BIOS codes, the power-on method comprising:
   initializing the processor in a Hyper-Threading disabled mode, such that the cache memory is accessible;
   copying the BIOS codes from the ROM to the cache memory after the processor is in the Hyper-Threading disabled mode;
   initializing the main memory by executing the BIOS codes in the cache memory; and
   re-initializing the processor in a Hyper-Threading enabled mode with help of the main memory after the main memory is initialized.

2. The power-on method as claimed in claim 1, wherein:
   the processor comprises a first logic unit and a second logic unit; and
   the step of initializing the processor comprises:
      providing a first potential to pin A31 of the processor; and
      delivering a reset signal to the processor while the pin A31 is at the first potential, such that the processor is initialized in the Hyper-Threading disabled mode, wherein:
      only the first logic unit is activated in the Hyper-Threading disabled mode.

3. The power-on method as claimed in claim 2, wherein the step of re-initializing the processor comprises:
   providing a second potential to pin A31 of the processor; and
   delivering a reset signal to the processor while the pin A31 is at the second potential, such that the processor is initialized in the Hyper-Threading enabled mode, wherein:
   both the first logic unit and the second logic unit are activated in the Hyper-Threading enabled mode.

4. The power-on method as claimed in claim 3, further comprising:
   initializing the second logic unit after the processor is re-initialized in the Hyper-Threading enabled mode; and
   loading an operating system after the second logic unit is initialized.

5. The power-on method as claimed in claim 3, wherein the first potential represents logic "1" and the second potential represents logic "0".

6. A computer system, comprising:
   a processor, supporting Hyper-Threading, comprising a cache memory;
   a main memory;
   a read only memory (ROM), comprising BIOS codes; and
   a Northbridge; wherein:
   the Northbridge initializes the processor in a Hyper-Threading disabled mode after power on. such that the cache memory is accessible;
   the Northbridge copies the BIOS codes from the ROM to the cache memory after the processor is initialized in the Hyper-Threading disabled mode;
   the processor executes the BIOS codes stored in the cache memory to initialize the main memory; and
   the Northbridge re-initializes the processor in a Hyper-Threading enabled mode with help of the main memory after the main memory is initialized.

7. The computer system as claimed in claim 6, wherein:
   the processor comprises a first logic unit and a second logic unit; and
   the North bridge provides a first potential to pin A31 of the processor, and delivers a reset signal to the processor while the pin A31 is at the first potential, such that the processor is initialized in the Hyper-Threading disabled mode, wherein:
   only the first logic unit is activated in the Hyper-Threading disabled mode.

8. The computer system as claimed in claim 7, wherein:
   the Northbridge provides a second potential to pin A31 of the processor, and delivers a reset signal to the processor while the pin A31 is at the second potential, such that the processor is initialized in the Hyper-Threading enabled mode, wherein:
   both the first logic unit and the second logic unit are activated in the Hyper-Threading enabled mode.

9. The computer system as claimed in claim 8, wherein:
   the second logic unit is initialized after the processor is re-initialized in the Hyper-Threading enabled mode; and
   an operating system is loaded after the second logic unit is initialized.

10. The computer system as claimed in claim 9, wherein the first potential represents logic "1" and the second potential represents logic "0".

11. A Basic Input Output System (BIOS), stored in a Read Only Memory (ROM) in a computer system comprising a processor supporting Hyper-Threading, and a main memory, wherein the processor comprises a cache memory; the BIOS processing the following steps:

- initializing the processor in a Hyper-Threading disabled mode, such that the cache memory is accessible;
- copying the BIOS codes from the ROM to the cache memory after the processor is in the Hyper-Threading disabled mode;
- initializing the main memory by executing the BIOS codes in the cache memory; and
- re-initializing the processor in a Hyper-Threading enabled mode with help of the main memory after the main memory is initialized.

12. The BIOS as claimed in claim 11, wherein:

the processor comprises a first logic unit and a second logic unit; and the step of initializing the processor comprises:

- providing a first potential to pin A31 of the processor; and
- delivering a reset signal to the processor while the pin A31 is at the first potential, such that the processor is initialized in the Hyper-Threading disabled mode, wherein:

only the first logic unit is activated in the Hyper-Threading disabled mode.

13. The BIOS as claimed in claim 12, wherein the step of re-initializing the processor comprises:

- providing a second potential to pin A31 of the processor; and
- delivering a reset signal to the processor while the pin A31 is at the second potential, such that the processor is initialized in the Hyper-Threading enabled mode, wherein:

both the first logic unit and the second logic unit are activated in the Hyper-Threading enabled mode.

14. The BIOS as claimed in claim 13, further comprising:

initializing the second logic unit after the processor is re-initialized in the Hyper-Threading enabled mode; and loading an operating system after the second logic unit is initialized.

15. The BIOS as claimed in claim 14, wherein the first potential represents logic "1" and the second potential represents logic "0".

* * * * *